United States Patent
Torii

(10) Patent No.: US 7,458,628 B2
(45) Date of Patent: Dec. 2, 2008

(54) VEHICLE SUN VISORS WITH SUPPORT RODS

(75) Inventor: Hidekazu Torii, Toyota (JP)

(73) Assignees: Kyowa Sangyo Co., Ltd., Aichi-Ken (JP); Shinwa Seiko Co., Ltd., Aichi-Ken (JP)

( * ) Notice: Subject to any disclaimer, the term of this patent is extended or adjusted under 35 U.S.C. 154(b) by 0 days.

(21) Appl. No.: 11/135,049

(22) Filed: May 23, 2005

(65) Prior Publication Data

US 2005/0264023 A1     Dec. 1, 2005

(30) Foreign Application Priority Data

May 27, 2004   (JP) ............................. 2004-157249

(51) Int. Cl.
*B60J 3/00* (2006.01)
(52) U.S. Cl. ................... 296/97.9; 296/97.12
(58) Field of Classification Search .............. 296/97.9, 296/97.1, 97.12, 97.13; 16/2.1
See application file for complete search history.

(56) References Cited

U.S. PATENT DOCUMENTS 4,953,064 A * 8/1990 Viertel et al. .............. 362/492
5,107,569 A * 4/1992 Hughes ...................... 16/2.1

FOREIGN PATENT DOCUMENTS

JP       2002-192948       7/2002

* cited by examiner

*Primary Examiner*—Glenn Dayoan
*Assistant Examiner*—Melissa A Black
(74) *Attorney, Agent, or Firm*—Conley Rose, P.C.

(57) ABSTRACT

A vehicle sun visor including a visor body and a support rod disposed on the visor body. The support rod is adapted to engage a support hook mounted to a vehicle cabin ceiling. The support rod includes a core rod member mounted on the visor body and an outer sleeve disposed on the outer peripheral side of the core rod member. The outer sleeve includes first and second semi-circular cylindrical sleeve halves each having at least one resilient engaging portion formed integrally therewith. The resilient engaging portions resiliently engage an outer peripheral surface of the core rod member. The semi-circular cylindrical sleeve halves may have similar configurations with each other.

18 Claims, 7 Drawing Sheets

VEHICLE SUN VISORS WITH SUPPORT RODS

This application claims priority to Japanese patent application serial number 2004-157249, the contents of which are incorporated herein by reference.

BACKGROUND OF THE INVENTION

1. Field of the Invention

The present invention relates to vehicle sun visors, and in particular to vehicle sun visors having a visor body and a support rod provided on the visor body for engagement with a support hook mounted to a vehicle cabin ceiling.

2. Description of the Related Art

A known vehicle sun visor has a visor body as a major element. The visor body is rotatably supported by a horizontal rod portion of a first support rod that is supported on a vehicle cabin ceiling via a bracket. Therefore, the visor body can move between a storage position along the vehicle cabin ceiling and a light-shielding position along a windshield as the visor body rotates relative to the horizontal rod portion of the first support rod.

In order to enable the visor body to stably rotate, there has been proposed to provide a second support rod at a predetermined position. The second support rod has the same axis as the horizontal rod portion of the first support rod and is rotatably engageable with a support hook mounted to the vehicle cabin ceiling.

In general, the second support rod includes a core rod member and a tubular outer sleeve disposed on the outer peripheral side of the core rod. The outer sleeve is typically constituted by first and second sleeve halves that are joined to each other at their joint surfaces, for example, by utilizing a high frequency or ultrasonic welding technique, or by an adhesive agent, in order to configure the second support rod.

However, if the first and second sleeve halves are joined at the joint surfaces by welding, it is likely that weld flash may be formed so as to extend beyond the joint surfaces. Similarly, if an adhesive agent joins the first and second sleeve halves at the joint surfaces it is likely that a part of the adhesive agent extends to the outside of the joint surfaces.

In order to prevent the formation of weld flash, Japanese Laid-Open Patent Publication No. 2002-192948 proposes to form a claw-like engaging projection on the first sleeve halve and to form a mating engaging portion on the second sleeve halve for engagement with the engaging projection.

However, using this construction of forming the engaging projection on the first sleeve halve and forming the mating engaging portion on the second sleeve halve, there is a possibility that the outer sleeve, formed by the first sleeve halve and the second sleeve halve thus constructed, may be displaced in the radial direction relative to the core rod member. In addition, if displacement prevention portions are formed on the first and second sleeve halves, the construction of the outer sleeve may become complicated. Furthermore, the first and second sleeve halves must be molded separately by using differently configured molds.

SUMMARY OF THE INVENTION

It is accordingly an object of the present invention to teach vehicle sun visors having a support rod that is simple in construction while causing minimal radial displacement of the outer sleeve relative to a core rod member.

In one aspect of the present teachings, vehicle sun visors are taught that have a visor body and a support rod disposed on the visor body and adapted to engage a support hook mounted to a vehicle cabin ceiling. The support rod includes a core rod member mounted on the visor body and an outer sleeve disposed on the outer peripheral side of the core rod member. The outer sleeve includes first and second semi-circular cylindrical sleeve halves each having at least one resilient engaging portion formed integrally therewith and resiliently engaging with an outer peripheral surface of the core rod member.

With this arrangement, the first and second semi-circular cylindrical sleeve halves may be assembled into the outer sleeve when their resilient engaging portions engage with the outer peripheral surface of the core rod member. Since the first and second semi-circular cylindrical sleeve halves constituting the outer sleeve are directly engaged with the outer peripheral surface of the core rod member in order to configure the rotatably support rod, possible displacement of the outer sleeve in the radial direction relative to the core rod member can be minimized.

In one embodiment, the at least one resilient engaging portion has a first engaging claw and a second engaging claw having terminal ends spaced apart from each other. The first and second engaging claws are resiliently deformed to be opened and engaged with the outer peripheral surface of the core rod member.

Therefore, the resilient engaging portion can be easily engaged with the outer peripheral surface of the core rod member by the resilient deformation of the first and second engaging claws that are resiliently deformed open and then engaged with the outer peripheral surface of the core rod member. For example, pressing the first and second engaging claws against the outer peripheral surface of the core rod member may cause such resilient deformation of the first and second engaging claws. Therefore the assembly operation of the first and second semi-circular cylindrical sleeve halves can be easily performed.

In another embodiment, the first and second semi-circular cylindrical sleeve halves are molded from resin so as to have the same configuration with each other. The first and second engaging claws of the at least one resilient engaging portion are disposed so as to oppose each other at the same position along an axis of the outer sleeve.

For example, the distance of the at least one resilient member from one end of the first semi-circular cylindrical sleeve halve in the axial direction of the outer sleeve may be set to be equal to the distance of the at least one resilient member from one end of the second semi-circular cylindrical sleeve halve on the side opposite to one end of the first semi-circular cylindrical sleeve halve. With this arrangement, the first and second semi-circular cylindrical sleeve halves may be fitted onto the outer peripheral surface of the core rod member while they are oriented in opposing directions with respect to the axial direction.

This configuration also allows the molding of the first and second semi-circular cylindrical sleeve halves by the same molding die. In addition, the assembly operation and the product control of the first and second semi-circular cylindrical sleeve halves may be readily facilitated. Therefore, the result is effective cost reduction.

In an alternative embodiment, the first and second engaging claws of the at least one resilient engaging portion are displaced apart from each other by a distance corresponding to the thickness of the first and second engaging claws along an axis of the outer sleeve.

As a result of this arrangement, it is not necessary to orient the first and second semi-circular cylindrical sleeve halves in opposing directions for fitting onto the outer peripheral surface of the core rod member. Therefore, the assembly operation of the first and second semi-circular cylindrical sleeve halves may be further facilitated.

DETAILED DESCRIPTION OF THE INVENTION

Each of the additional features and teachings disclosed above and below may be utilized separately or in conjunction with other features and teachings to provide improved vehicle sun visors and methods of manufacturing such sun visors. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Representative embodiments of the present invention will now be described with reference to the drawings.

First Representative Embodiment

Figure 1:
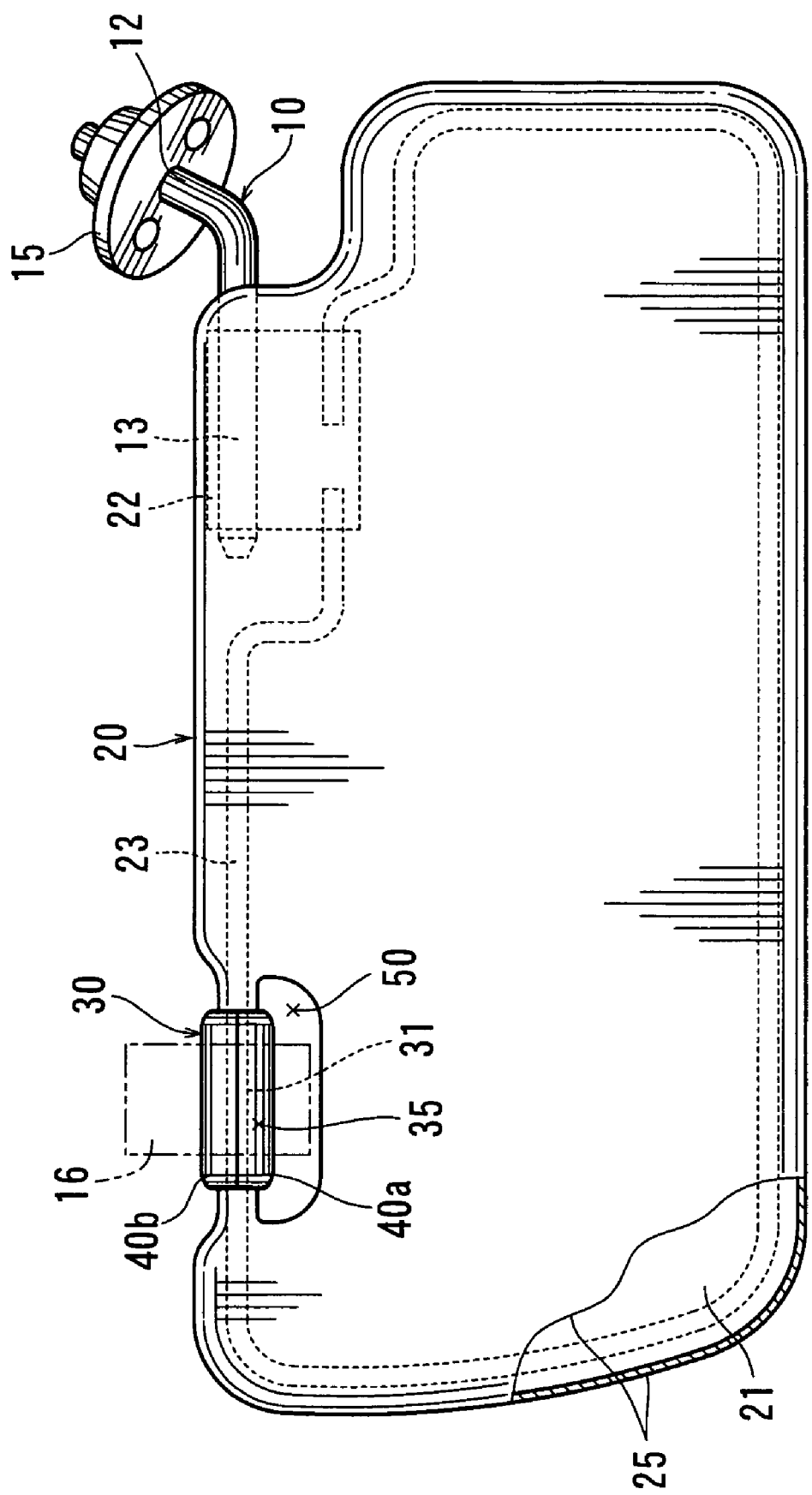
FIG. 1 is a front view of a vehicle sun visor according to a first representative embodiment of the present invention.

Referring to FIG. 1, a first representative sun visor generally includes a visor body 20 and a first support rod 10. The support rod 10 has a substantially L-shaped configuration and includes a vertical rod portion 12 integrated with a horizontal rod portion 13. The vertical rod portion 12 is mounted to a vehicle cabin ceiling (not shown) at a suitable position via a bracket 15. The visor body 20 is configured so as to have a predetermined configuration. The visor body 20 includes a core member 21 and a surface cover sheet 25 covering an outer surface of the cover member 21. A bearing member 13 is disposed within the core member 21 at a position adjacent to one of corners of the core member 21. The horizontal portion 13 of the first support rod 10 is rotatably inserted into the bearing member 13. The visor body 20 can pivot about the horizontal portion 13 to move between a storage position along the vehicle cabin ceiling and a front light-shielding position adjacent to a windshield (not shown). In addition, the visor body 20 can pivot together with the support rod 10 about an axis of the vertical rod portion 12. The visor body 20 moves from a front light-shielding position to a side light-shielding position along one of the side window by pivotally moving through an angle of about 90° toward a rear side of the vehicle cabin.

As shown in FIG. 1, a second support rod 30 is disposed on the visor body 20 in a predetermined position (i.e., the left upper side as viewed in FIG. 1 in this representative embodiment). The second support rod 30 extends along the same axis as the horizontal rod portion 13 of the first support rod 10. The second support rod 30 is rotatable about its axis and is adapted to be releasably engaged with a support hook 16 that is mounted to the vehicle cabin ceiling. The second support rod 30 has a core rod member 31 and an outer sleeve 35 disposed on the outer peripheral side of the core rod member 31. In this representative embodiment, a wire frame 23 is disposed within the visor body 20 along the outer periphery of the core member 21. A part of the wire frame 23 is exposed outside of the visor body 20 at a position adjacent an open side (i.e., the upper side as viewed in FIG. 1) of a cut-out slot 50 that is formed in the visor body 20 in a position on the left upper side as viewed in FIG. 1. The part of the wire frame 23 thus exposed to the outside is configured as the core rod member 31.

Figure 2:
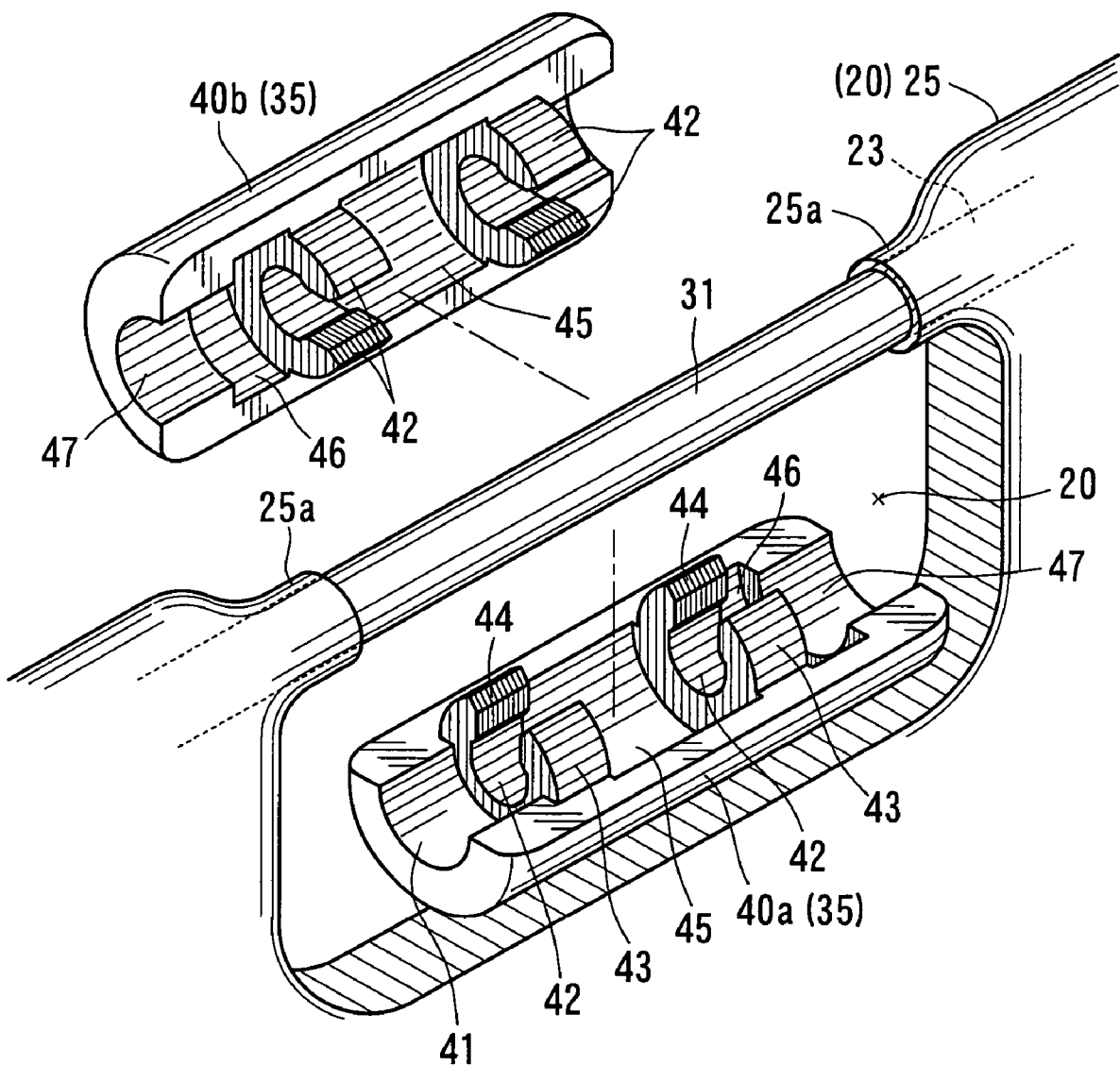
FIG. 2 is a perspective view of a portion around a second support rod of the vehicle sun visor showing first and second semi-circular cylindrical sleeve halves exploded and separated from a core rod member of the second support rod.

As shown in FIG. 2, the outer sleeve 35 is constituted by first and second semi-circular cylindrical sleeve halves 40a and 40b that are molded out of resin. The first and second semi-circular cylindrical sleeve halves 40a and 40b are adapted to be fitted onto the outer peripheral surface of the core rod member 31. The sleeve halves 40a and 40b are joined to each other at their joint surfaces that extend along the radial direction of the assembled outer sleeve 35. Two resilient engaging portions 42 are formed integrally with each of the sleeve halves 40a and 40b and protrude beyond the corresponding joint surface. In the assembled state the resilient engaging portions 42 resiliently engage with the outer peripheral surface of the core rod member 31.

In this representative embodiment, the positions of the resilient engaging portions 42 are determined such that the distance L1 (see FIG. 5) between the left end of the first semi-circular cylindrical sleeve halve 40a and one of the resilient engaging portions 42 positioned on the left side as viewed in FIG. 2, is substantially equal to the distance L2 (see FIG. 5) between the right end of the second semi-circular cylindrical sleeve halve 40b and one of the resilient engaging portions 42 positioned on the right side as viewed in FIG. 2. In addition, the distance between two resilient engaging portions 42 of the first semi-circular cylindrical sleeve halve 40a is substantially equal to the distance between two resilient engaging portions 42 of the second semi-circular cylindrical sleeve halve 40b. Therefore, the first and second semi-circular cylindrical sleeve halves 40a and 40b have the same configuration and are exchangeable with each other by inverting their orientations with respect to the axial direction of the assembled outer sleeve 35 when they are fitted onto the outer peripheral surface of the core rod member 31. In other words, a semi-circular cylindrical sleeve molded as the first semi-circular cylindrical sleeve halve 40a (40b) can also be used as the second semi-circular cylindrical sleeve halve 40b (40a).

Figure 3:
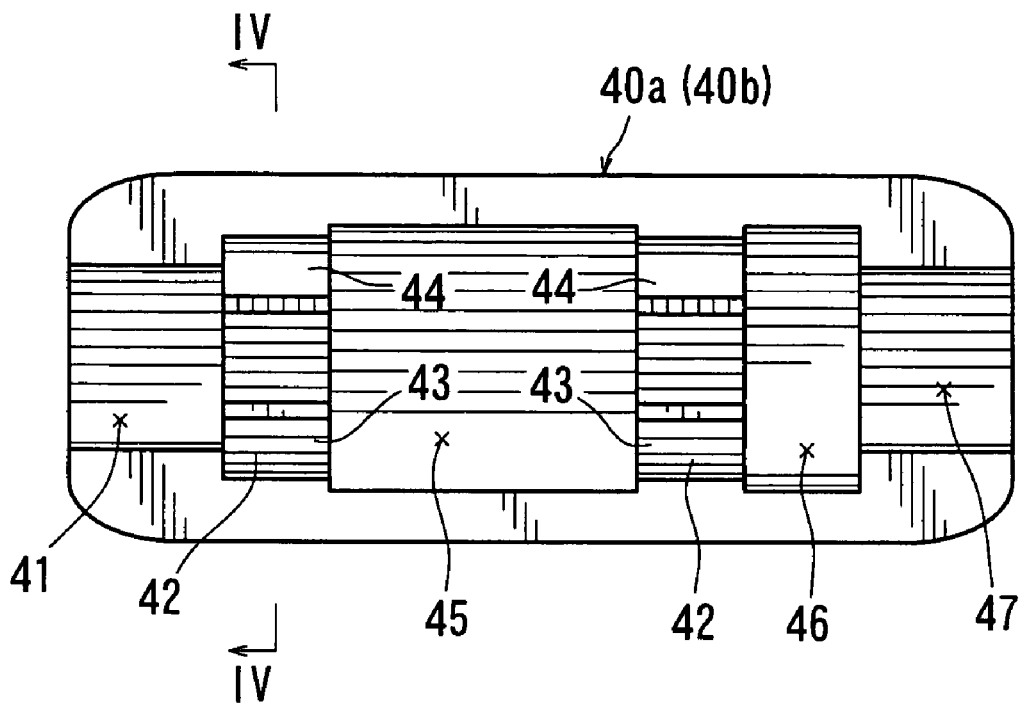
FIG. 3 is a side view of the first semi-circular cylindrical sleeve halve.
Figure 5:
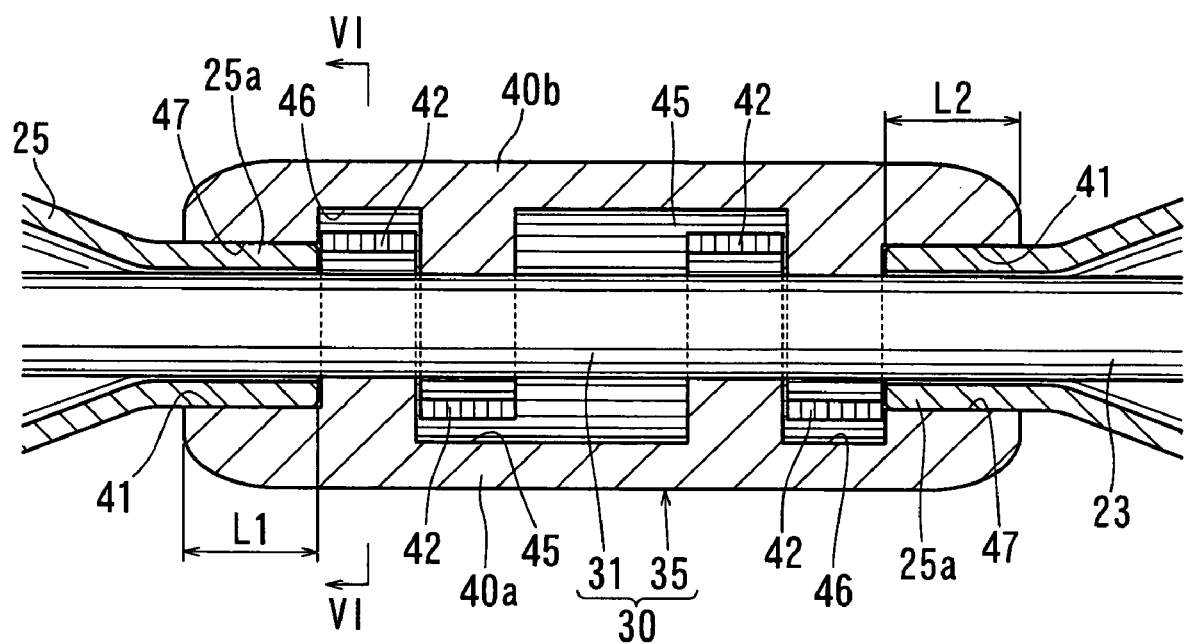
FIG. 5 is a longitudinal sectional view of the second support rod showing the first and second semi-circular cylindrical sleeve halves assembled to the core rod member.

More specifically, as shown in FIGS. 3 and 5, the inner wall of each of the first and second semi-circular cylindrical sleeve halves 40a and 40b defines a first terminal recess 41, a first receiving recess 45, a second receiving recess 46, and a second terminal recess 47. One of the resilient engaging portions 42 is positioned between the first terminal recess 41 and the first receiving recess 45. The other of the resilient engaging portions 42 is positioned between the first receiving recess 45 and the second receiving recess 46. The first terminal recess 41, the first receiving recess 45, the second receiving recess 46, and the second terminal recess 47 are arranged in this order in the rightward direction for the first semi-circular cylindrical sleeve halve 40a. The first terminal recess 41, the first receiving recess 45, the second receiving recess 46, and the second terminal recess 47, are arranged in this order in the leftward direction for the second semi-circular cylindrical sleeve halve 40b (i.e., the first semi-circular cylindrical sleeve halve 40a is rotated 180° about a center point of the sleeve halve with regard to length within the plane of the drawing sheet to become the second semi-circular cylindrical sleeve halve 40b).

Figure 4:
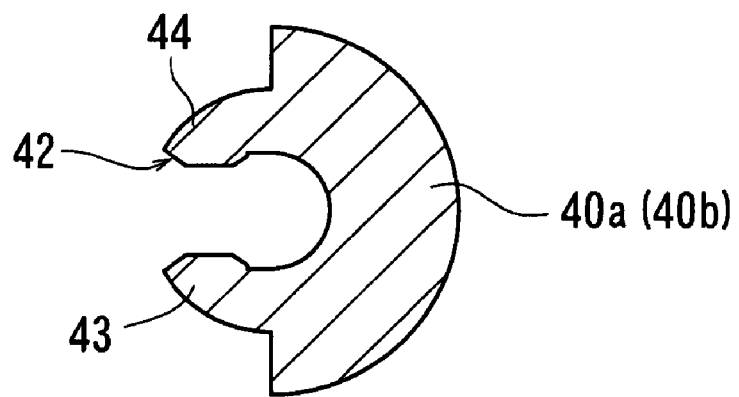
FIG. 4 is a cross-sectional view taken along line IV-IV in FIG. 3.
Figure 6:
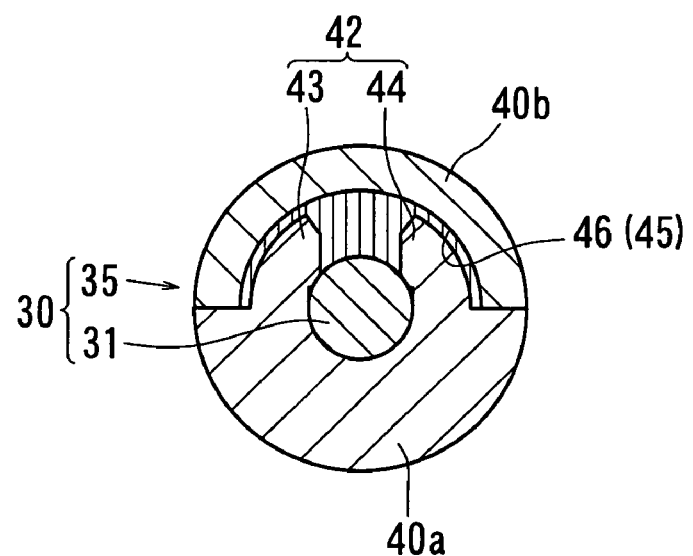
FIG. 6 is a cross-sectional view taken along line VI-VI in FIG. 5.
Figure 7:
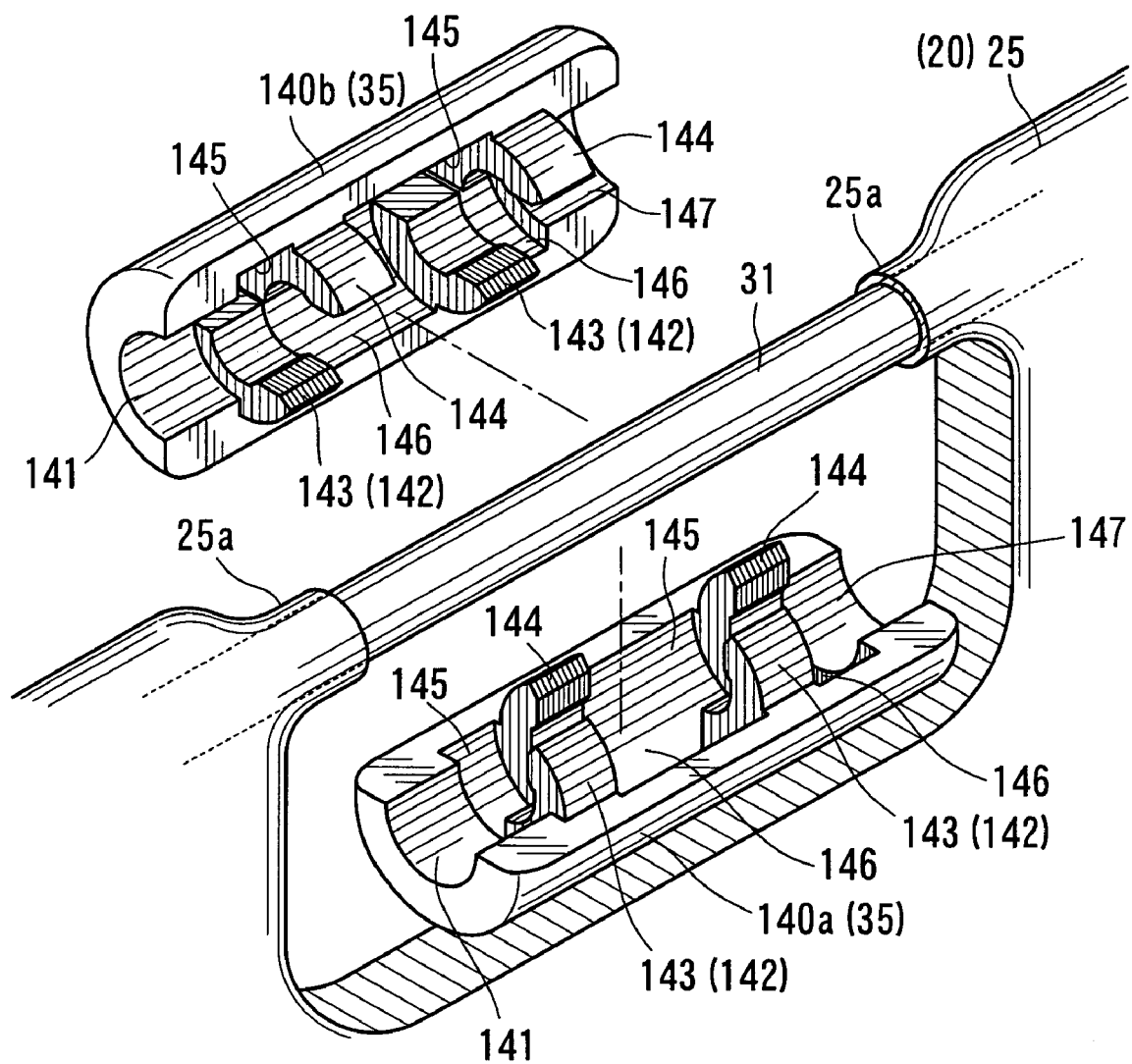
FIG. 7 is a perspective view of a portion around a second support rod of a vehicle sun visor according to a second representative embodiment showing the first and second semi-circular cylindrical sleeve halves exploded and separated from a core rod member of the second support rod.
Figure 8:
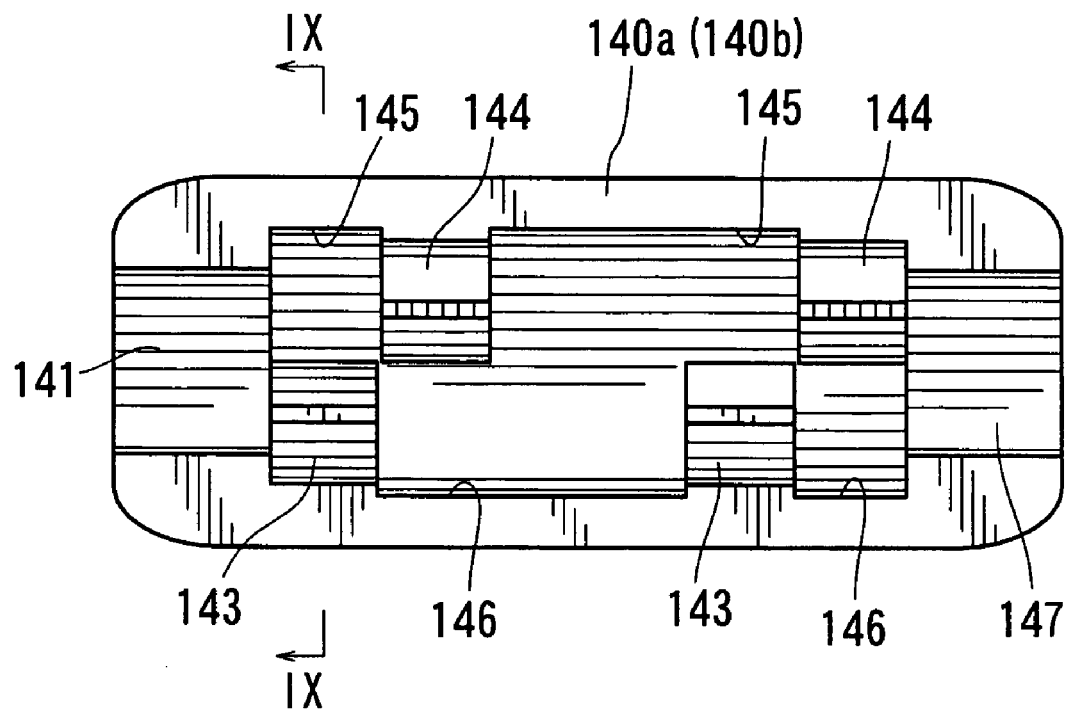
FIG. 8 is a side view of the first semi-circular cylindrical sleeve halve.
Figure 9:
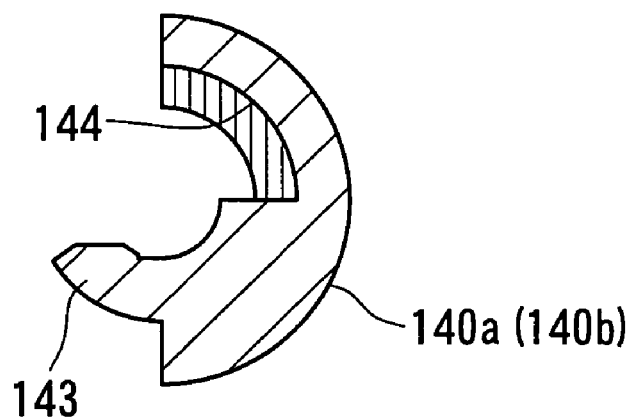
FIG. 9 is a cross-sectional view taken along line IX-IX in FIG. 8.
Figure 10:
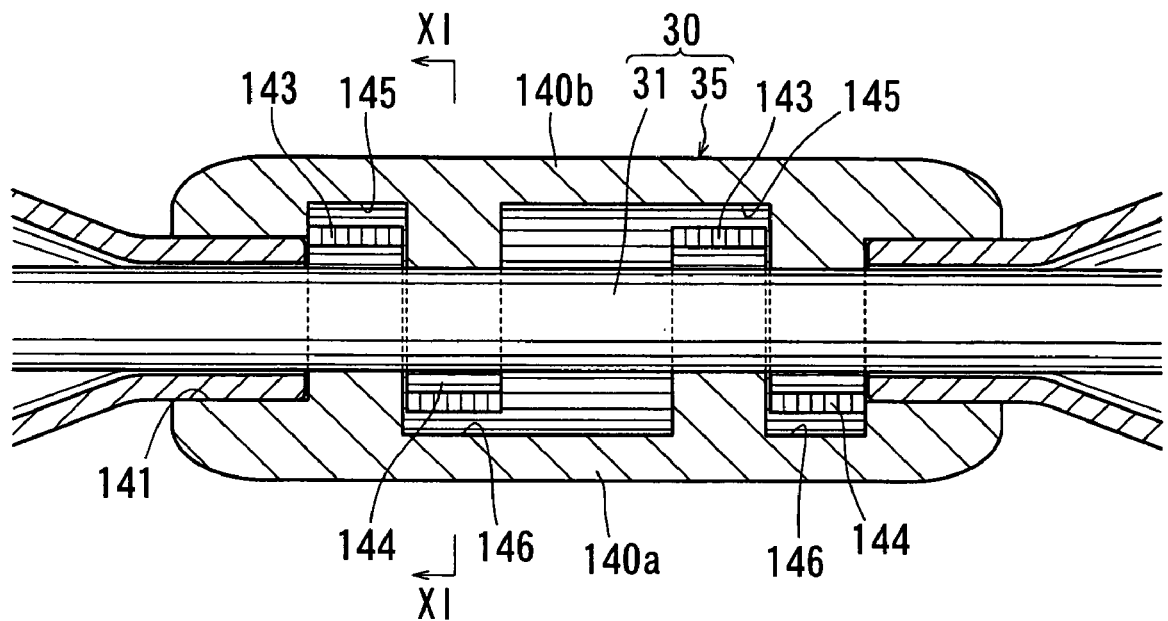
FIG. 10 is a longitudinal sectional view of the second support rod showing the first and second semi-circular cylindrical sleeve halves assembled to the core rod member.
Figure 11:
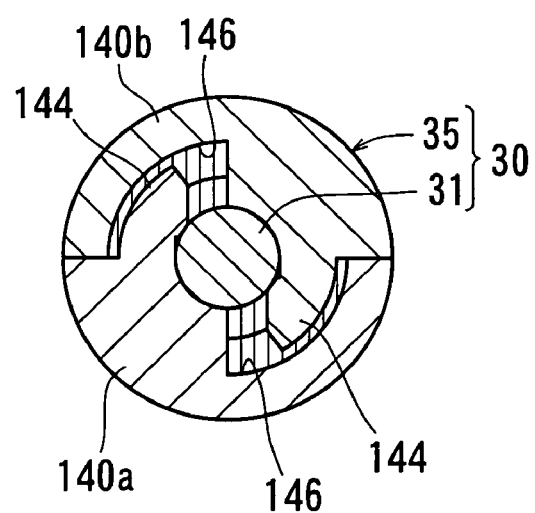
FIG. 11 is a cross-sectional view taken along line XI-XI in FIG. 10.

In addition, as shown in FIGS. 3, 4, and 6, each of the resilient engaging portions 42 includes first and second engaging claws 43 and 44 that contact with the outer peripheral surface of the core rod member 31. The first and second engaging claws 43 and 44 resiliently enlarge at their free ends when fitted onto the outer peripheral surface of the core rod member 31. The first and second engaging claws 43 and 44 may have curved opposing surfaces each having a radius of curvature substantially corresponding to the radius of curvature of the outer peripheral surface of the core rod member 31 in the fitted state of the resilient engaging portion 42. As shown in FIG. 4 and viewed in a cross-section from within a plane extending through the first and second engaging claws 43 and 44, each of the first and second semi-circular cylindrical sleeve halves 40a and 40b have a substantially C-shaped cross-sectional configuration in which the first and second engaging claws 43 and 44 correspond to circumferential end portions of the C-shape.

Further, as shown in FIG. 5, each of the first and second terminal recesses 41 and 47 of the first and second semi-circular cylindrical sleeve halves 40a and 40b has a radially inner wall that has a diameter slightly greater than the outer diameter of the core rod member 31. A tubular part 25a of the surface cover material 25 can be inserted into the corresponding first and second terminal recesses 41 and 47 at each end in the axial direction of the outer sleeve 35. The tubular parts 25a may then be held between the radially inner walls of the first and second terminal recesses 41 and 47 and the outer peripheral surface of the core rod member 31.

Furthermore, the sizes in the radial direction of the first and second receiving recesses 45 and 46 of the first and second semi-circular cylindrical sleeve halves 40a and 40b are determine such that the resilient engaging portions 42 of one of the first and second semi-circular cylindrical sleeve halves 40a and 40b are respectively suitably received within the first and second receiving recesses 45 and 46 of the other of the first and second semi-circular cylindrical sleeve halves 40a and 40b.

In operation, according to the first representative vehicle sun visor, the first and second semi-circular cylindrical sleeve halves 40a and 40b may be fitted onto the outer peripheral surface of the core rod member 31 of the visor body 20 through engagement of the first and second engaging claws 43 and 44 of the resilient engaging portions 42. The engagement results from the first and second engaging claws 43 and 44 being resiliently enlarged and diminished about the core rod member 31. In this way, the second support rod 30 may be completed when the outer sleeve 35 is assembled (see FIGS. 5 and 6).

In addition, any potential displacement of the outer sleeve 35 in the radial direction relative to the core rod member 31 may be reliably prevented since the first and second semi-circular cylindrical sleeve halves 40a and 40b are directly engaged with the core rod member 31 via the resilient engaging portions 42.

Further, each of the resilient engaging portions 42 of the first and second semi-circular cylindrical sleeve halves 40a and 40b have first and second engaging claws 43 and 44 that are spaced apart from each other by a suitable distance at their terminal ends. This allows the first and second engaging claws 43 and 44 to open via resilient deformation (i.e., to increase the distance between the terminal ends). The first and second engaging claws 43 and 44 are then engaged with the outer peripheral surface of the core rod member 31 during the fitting operation of the first and second semi-circular cylindrical sleeve halves 40a and 40b. Therefore, simply simply pressing the first and second claws 43 and 44 against the outer peripheral surface of the core rod member 31 can easily perform the fitting operation. In this respect, the assembly operation of the outer sleeve 35 can also be easily performed.

Furthermore, resin molded products having the same configuration can be commonly used as the first and second semi-circular cylindrical sleeve halves 40a and 40b. In order to form the outer sleeve 31 it is only necessary to orient the first and second semi-circular cylindrical sleeve halves 40a and 40b in opposite directions to each other with regard to the axial direction when fitting the first and second semi-circular cylindrical sleeve halves 40a and 40b onto the core rod member 31. Therefore, the same molding die can mold the first and second semi-circular cylindrical sleeve halves 40a and 40b. In addition, the fitting operation of the first and second semi-circular cylindrical sleeve halves 40a and 40b onto the outer peripheral surface of the core rod member 31 can be easily performed. Further, the product control of the first and second semi-circular cylindrical sleeve halves 40a and 40b can be easily facilitated. Therefore, the result is more effective cost reduction.

Second Representative Embodiment

A second representative embodiment will now be described with reference to FIGS. 7 to 11. The second representative embodiment is a modification of the first representative embodiment. Therefore, like members are given the same reference numerals as in the first representative embodiment and the description of these members will not be repeated.

This representative embodiment relates to an improvement of the first representative embodiment for eliminating the directional limitation of the first and second semi-circular cylindrical sleeve halves 40a and 40b of the outer sleeve 35 of the second support rod 30.

Also in this representative embodiment, first and second semi-circular cylindrical sleeve halves 140a and 140b (corresponding to the first and second semi-circular cylindrical sleeve halves 40a and 40b of the first representative embodiment) are molded from resin to have the same configuration with one another. Each of the first and second semi-circular cylindrical sleeve halves 140a and 140b includes resilient engaging portions 142 (corresponding to the resilient engaging portions 42 of the first representative embodiment). The resilient engaging portions 142 include first and second engaging claws 143 and 144 (corresponding to the first and second engaging claws 42 and 43).

However, the first and second engaging claws 143 and 144 are displaced from each other along the axial direction of the outer sleeve 35 by a distance corresponding to the thickness of the first and second engaging claws 143 and 144.

In addition, the inner wall of each of the first semi-circular cylindrical sleeve halves 140a and 140b defines a first terminal recess 141, two first receiving recesses 145, two second receiving recess 146, and a second terminal recess 147. Each of the first receiving recesses 145 is positioned to oppose the first engaging claw 143 in the circumferential direction. Similarly, each of the second receiving recesses 146 is positioned to oppose the second engaging claw 144 in the circumferential direction. Therefore, the first terminal recess 141, one of the first receiving recesses 145 and the first engaging claw 143 of one of the resilient engaging portions 142, one of the second receiving recesses 146 and the second engaging claw 144 of one of the resilient engaging portions 142, the other of the first receiving recesses 145 and the first engaging claw 143 of the other of the resilient engaging portions 142, the other of the second receiving recesses and the second engaging claw 144 of the other of the resilient engaging portions 142, and the second terminal recess 147, are positioned in this order in the rightward direction as viewed in FIGS. 7 and 8.

Also with this second representative embodiment, each of the first and second semi-circular cylindrical sleeve halves 140a and 140b may be fitted onto the core rod member 31 by pressing the resilient engaging portions 142 against the outer peripheral surface of the core rod member 31. Thus, as the resilient engaging portions 142 are pressed against the outer peripheral surface of the core rod member 31, the first and second engaging claws 143 and 144 of each resilient engaging member 142 may be resiliently deformed open (i.e., to increase the distance between the terminal ends) and engaged with the outer peripheral surface of the core rod member 31. In this way, the second support rod 30 may be completed at the same time that the outer sleeve 35 is assembled (see FIGS. 10 and 11).

In addition, any potential displacement of the outer sleeve 35 in the radial direction relative to the core rod member 31 may be reliably prevented since the first and second semi-circular cylindrical sleeve halves 140a and 140b are directly engaged with the core rod member 31 via the resilient engaging portions 142.

Furthermore, resin molded products having the same configurations can be commonly used as the first and second semi-circular cylindrical sleeve halves 140a and 140b. Therefore, the same molding die can be used to mold the first and second semi-circular cylindrical sleeve halves 140a and 140b. Additionally, the fitting operation of the first and second semi-circular cylindrical sleeve halves 140a and 140b onto the outer peripheral surface of the core rod member 31 can be easily performed. The product control of the first and second semi-circular cylindrical sleeve halves 140a and 140b can also be readily facilitated. Therefore resulting in effective cost reduction.

In particular, according to the second representative embodiment, it is not necessary to orient the first and second semi-circular cylindrical sleeve halves 140a and 140b in opposing directions relative to each other in order to assemble the sleeve halves onto the outer peripheral surface of the core rod member 31. In other words, there is no limitation in the relative orientation of the first and second semi-circular cylindrical sleeve halves 140a and 140b. The fitting operation can therefore be further facilitated.

Other Possible Embodiment

The present invention may not be limited to the above first and second representative embodiments but may be modified in various ways. For example, although each of the first and second semi-circular cylindrical sleeve halves 40a and 40b (140a and 140b) of the outer sleeve 35 has two resilient engaging portions 42 (142), the number of the resilient engaging portions may not be limited to two. One or three or more resilient engaging portions may be provided.

This invention claims:
1. A vehicle sun visor comprising:
   a visor body; and
   a support rod disposed on the visor body and arranged and constructed to engage a support hook mounted to a vehicle cabin ceiling;
      wherein the support rod comprises;
      a core rod member having a central axis, wherein the core rod member is mounted on the visor body; and
      an outer sleeve disposed on the outer peripheral side of the core rod member and including a first semi-circular cylindrical sleeve half and a second semi-circular cylindrical sleeve half;
      wherein each semi-circular cylindrical sleeve half has at least one resilient engaging portion formed integrally therewith and arranged and constructed to resiliently engage with an outer peripheral surface of the core rod member; and
      wherein the at least one resilient engaging portion of the first semi-circular sleeve half and the at least one resilient engaging portion of the second semi-circular sleeve half engage with the outer peripheral surface of the core rod member independently of each other;
      wherein each resilient engaging portion has a first engaging claw and a second engaging claw having terminal ends spaced apart from each other;
      wherein each of the first and second engaging claws is resiliently deformed open and engaged with the outer peripheral surface of the core rod member;
      wherein each semi-circular cylindrical sleeve half is molded from resin; and
      wherein the first semi-circular cylindrical sleeve half has the same configuration as the second semi-circular cylindrical sleeve half;
      wherein each of the first and second engaging claws of each resilient engaging portion has an axial thickness, and wherein the first and the second engaging claws of each resilient engaging portion are axially offset from each other relative to the central axis by a distance corresponding to the axial thickness of the first and second engaging claws.
2. A vehicle sun visor comprising:
   a visor body; and
   a support rod arranged and constructed to engage a support hook mounted to a vehicle cabin ceiling, so that the visor body is supported by the support hook via the support rod;
      wherein the support rod comprises:
      a core rod member having an outer peripheral surface and mounted to the visor body; and
      an outer sleeve having a central axis and fitted onto the outer peripheral surface of the core rod member and including a first semi-circular cylindrical sleeve half and a second semi-circular cylindrical sleeve half;

wherein each of the first and second semi-circular cylindrical sleeve halves comprises a plurality of resilient engaging portion formed integrally therewith; and wherein each of the resilient engaging portions has a first engaging claw and a second engaging claw arranged and constructed to resiliently clamp the outer peripheral surface of the core rod member from opposing sides with respect to substantially the diametrical direction of the core rod member;

wherein the first and second engaging claws of the resilient engaging portions of the first semi-circular sleeve half and the first and second engaging claws of the resilient engaging portions of the second semi-circular sleeve half resiliently clamp the outer peripheral surface of the core rod member independently of each other;

wherein the first engaging claw of the first semi-circular cylindrical sleeve half is positioned to axially oppose the first engaging claw of the second semi-circular cylindrical sleeve half in an axial direction parallel to the central axis, and the second engaging claw of the first semi-circular cylindrical sleeve half is positioned to axially oppose the second engaging claw of the second semi-circular cylindrical sleeve half in an axial direction parallel to the central axis.

3. The vehicle sun visor as in claim 2,
wherein the first and second engaging claws have resiliently deformable free ends spaced from each other in a direction substantially parallel to the diametrical direction of the core rod member, so that the free ends are resiliently deformed to permit insertion of the core rod member between the first and second engaging claws.

4. The vehicle sun visor as in claim 2,
wherein each semi-circular cylindrical sleeve half is molded from resin; and
wherein the first semi-circular cylindrical sleeve half has the same configuration as the second semi-circular cylindrical sleeve half.

5. The vehicle sun visor as in claim 4,
wherein the first and second engaging claws of each resilient engaging portion are positioned at the same axial position; and
wherein each semi-circular cylindrical sleeve half is fitted onto the outer peripheral surface of the core rod member, the first and second semi-circular cylindrical sleeve halves are oriented in opposing directions to each other in order to avoid interference between the at least one resilient engaging portion of the first semi-circular cylindrical sleeve half and the at least one resilient engaging portion of the second semi-circular cylindrical sleeve half.

6. The vehicle sun visor as in claim 4,
wherein the first and second engaging claws of each resilient engaging portion are axially offset from each other;
wherein each semi-circular cylindrical sleeve half is fitted onto the outer peripheral surface of the core rod member, the first semi-circular cylindrical sleeve half being oriented in the same direction as the second semi-circular cylindrical sleeve half.

7. The vehicle sun visor as in claim 2,
wherein the first semi-circular cylindrical sleeve half has first recesses arranged and constructed to receive the first and second engaging claws of the second semi-circular cylindrical sleeve half; and
wherein the second semi-circular cylindrical sleeve half has second recesses arranged and constructed to receive the first and second engaging claws of the first semi-circular cylindrical sleeve half.

8. A vehicle sun visor comprising a visor body and a support rod arranged and constructed to engage a support hook mounted to a vehicle cabin ceiling, wherein the support rod comprises:
a core rod member having a central axis, wherein the core rod member is mounted to the visor body; and
an outer sleeve comprising:
two semi-circular cylindrical sleeve halves, wherein each semi-circular cylindrical sleeve half comprises two or more resilient engaging portions;
wherein each of the resilient engaging portions comprises:
a first engaging claw, and
a second engaging claw;
wherein each of the semi-circular cylindrical sleeve halves is attached to the core rod member via the at least one resilient engaging portion;
wherein the semi-circular sleeve halves are coupled to the core rod member independently of each other; and
wherein a first of the resilient engaging portions of a first of the semi-circular sleeve halves axially opposes a first of the resilient engaging portions of a second of the semi-circular sleeve halves in an axial direction parallel to the central axis, and a second of the resilient engaging portions of the first of the semi-circular sleeve halves axially opposes a second of the resilient engaging portions of the second of the semi-circular sleeve halves in an axial direction parallel to the central axis.

9. The vehicle sun visor as in claim 8 wherein each of the first engaging claws is diametrically opposed to each of the second engaging claws with regard to an axis of each semi-circular cylindrical sleeve half.

10. The vehicle sun visor as in claim 9 wherein each of the resilient engaging portions is resiliently deformed so as to clamp the core rod member.

11. The vehicle sun visor as in claim 8 wherein each of the first engaging claws is spaced apart from each of the second engaging claws along the axis of each semi-circular cylindrical sleeve half, and
each of the first engaging claws is located on an opposing side of the axis of each of the semi-circular cylindrical sleeve halves from each of the second engaging claws.

12. The vehicle sun visor as in claim 11 wherein each of the resilient engaging portions is resiliently deformed so as to clamp the core rod member.

13. The vehicle sun visor as in claim 12 wherein each semi-circular cylindrical sleeve half is made from resin.

14. The vehicle sun visor as in claim 10 wherein each semi-circular cylindrical sleeve halves is made from resin.

15. The vehicle sun visor as in claim 2, wherein the first and second engaging claws of the first semi-circular cylindrical sleeve half are respectively positioned axially adjacent to the first and second engaging claws of the second semi-circular cylindrical sleeve half.

16. The vehicle sun visor as in claim 8, wherein the resilient engaging portions of one semi-circular sleeve half is positioned axially adjacent to the resilient engaging portions of the other semi-circular half.

17. The vehicle sun visor as in claim 2, wherein the first and second engaging claws of each resilient engaging portion are axially offset from each other relative to the central axis.

18. The vehicle sun visor as in claim 8, wherein the second engaging claw is axially offset from the first engaging claw relative to the central axis.

* * * * *